Nov. 1, 1938.  A. F. BREITENSTEIN  2,135,067
AUTOMATIC RELEASING THREAD CUTTING TOOL
Filed Aug. 25, 1937  3 Sheets-Sheet 1
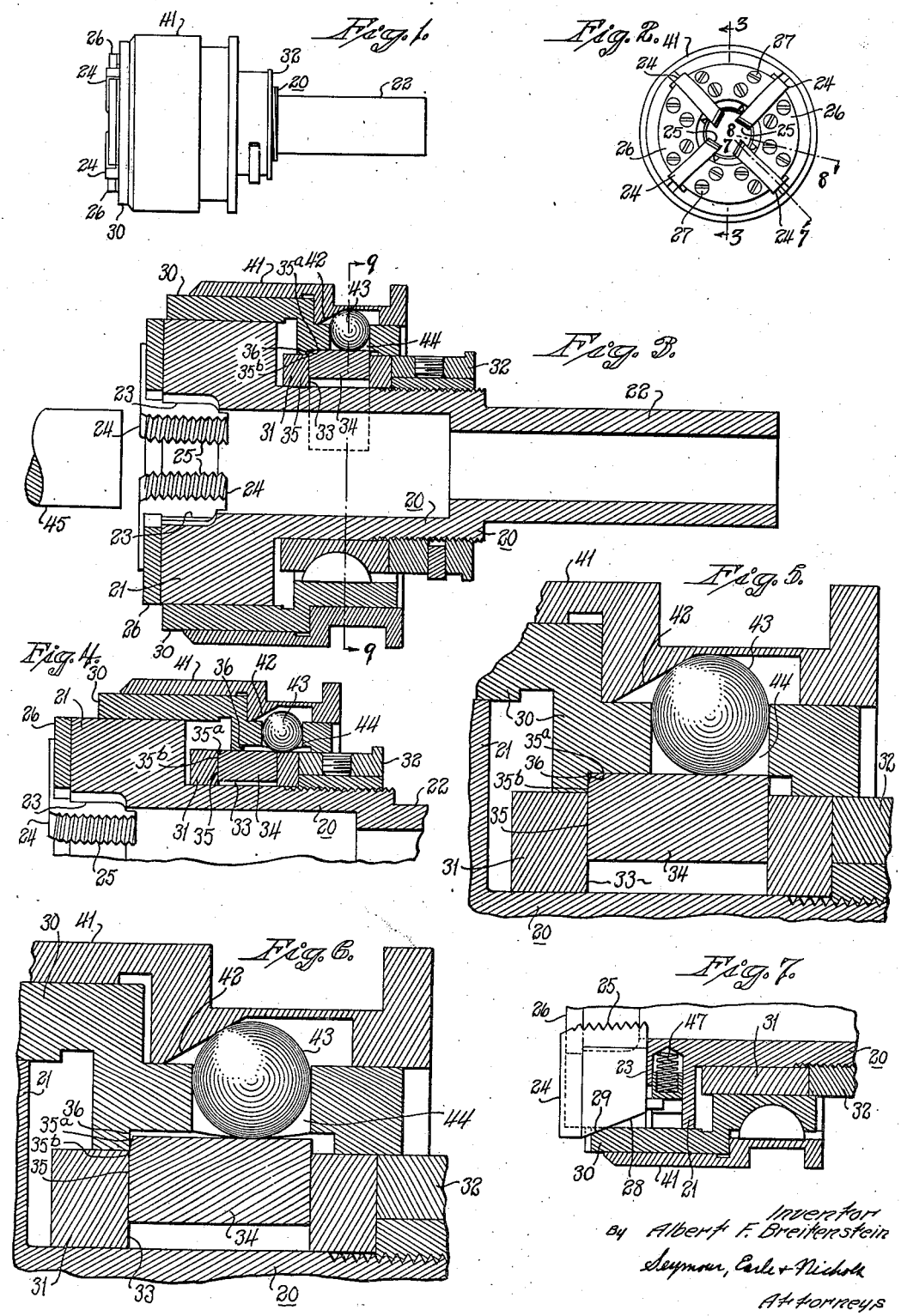

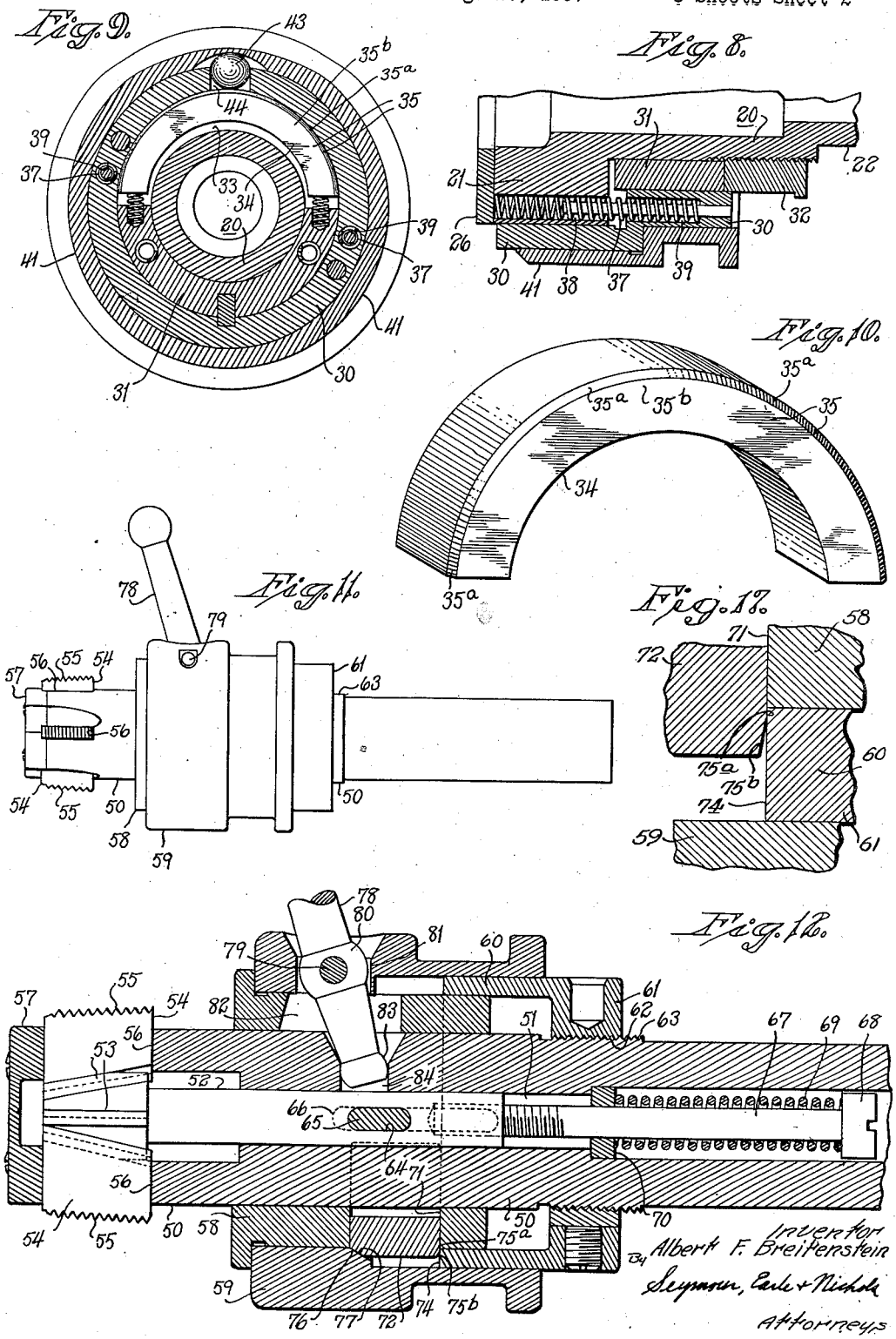

Nov. 1, 1938. A. F. BREITENSTEIN 2,135,067
AUTOMATIC RELEASING THREAD CUTTING TOOL
Filed Aug. 25, 1937 3 Sheets-Sheet 3
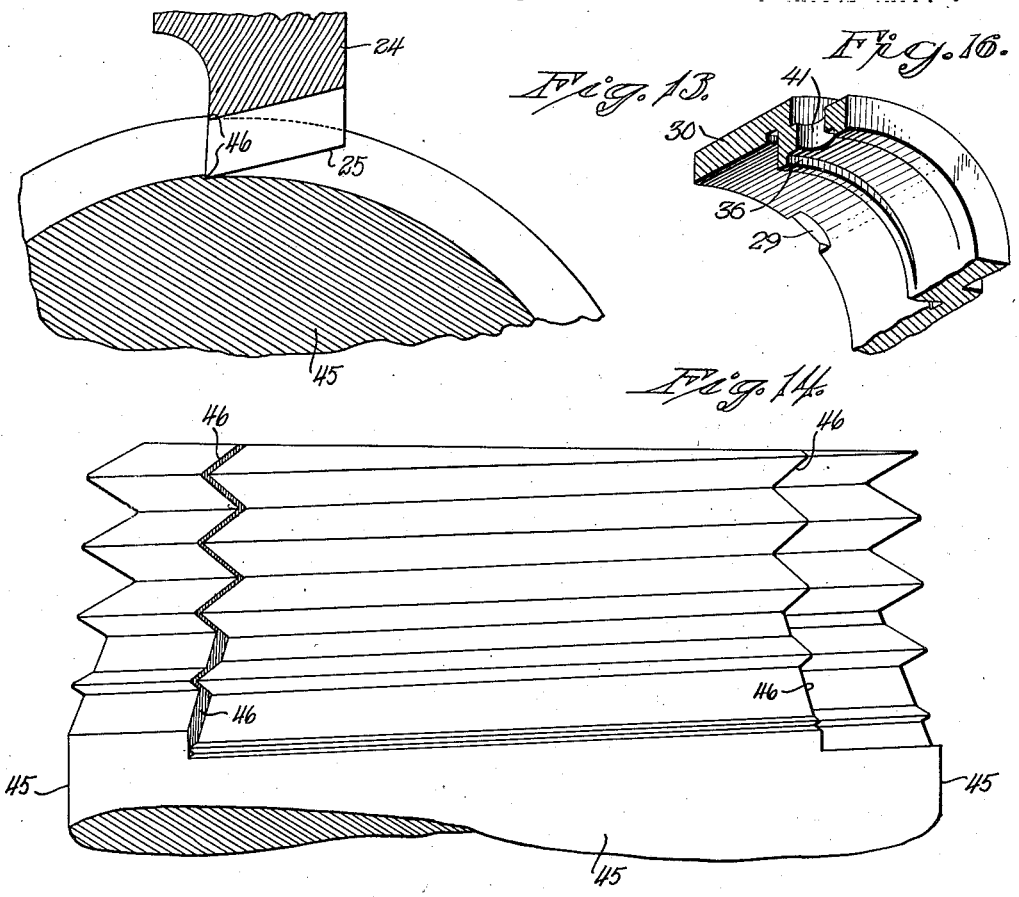
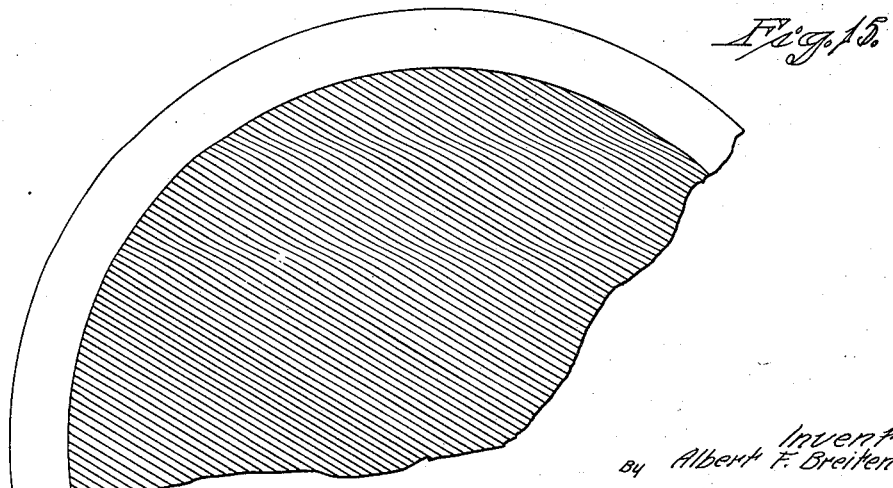
Inventor
By Albert F. Breitenstein
Seymour, Carter & Nichols
Attorneys Patented Nov. 1, 1938

2,135,067

UNITED STATES PATENT OFFICE 2,135,067

AUTOMATIC-RELEASING THREAD-CUTTING TOOL

Albert F. Breitenstein, New Haven, Conn., assignor to The Geometric Tool Company, New Haven, Conn., a corporation of Connecticut Application August 25, 1937, Serial No. 160,749

8 Claims. (Cl. 10—95)

This invention relates to an improvement in automatic-releasing thread-cutting tools, that is to say, thread-cutting tools which automatically retire their thread-cutting chasers from engagement with the work to thus permit the ready and rapid axial separation of the work and tool. More particularly, the present invention relates to thread-cutting tools of the character referred to, which are employed for cutting pipe-threads and other similarly-tapered threads, and which rely upon normally-stationary thread-cutting chasers which have their series of thread-cutting teeth arranged at the desired angle in contradistinction to thread-cutting tools which progressively retire their chasers during the normal thread-cutting operation, in order to effect the desired taper.

Thread-cutting tools of the type to which the present invention relates are apt to leave one or more objectionable longitudinal shoulders upon the threaded portion of the work (especially upon resilient material such as soft brass) after the tapered chasers have been retired radially from the work, much in the manner illustrated in Figs. 13 and 14 of the accompanying drawings. The problem of overcoming the difficulty just referred to has long vexed those skilled in the art.

The main object, therefore, of the present invention is to provide a superior automatic-releasing thread-cutting tool of the type referred to, which will produce tapered threads free from abrupt longitudinal shoulders.

A further object of the present invention is to provide a superior automatic-releasing thread-cutting tool which will maintain its thread-cutting chasers in fixed radial position during the normal threading operation, and which will at the termination of such operation retire the chasers radially in such manner as to erase or substantially erase such longitudinal shoulders as may exist upon the work at that time.

With the above and other objects in view, as will appear to those skilled in the art from the present disclosure, this invention includes all features in the said disclosure which are novel over the prior art.

In the accompanying drawings:

Fig. 1 is a view in side elevation of one form which a self-opening die-head embodying the present invention may assume;

Fig. 2 is a front face view thereof;

Fig. 3 is a view thereof in central longitudinal section taken on the line 3—3 of Fig. 2, the parts being shown in the positions which they assume for a normal thread-cutting operation;

Fig. 4 is a sectional view corresponding to Fig. 3, but less comprehensive than the same, and showing the parts in the positions which they assume after the complete retirement of the chasers;

Fig. 5 is a fragmentary sectional view on an enlarged scale showing some of the parts of the mechanism illustrated in the upper portion of Fig. 3;

Fig. 6 is a fragmentary sectional view corresponding to Fig. 5, but showing the parts in the positions which they assume at the instant the latch-member has been shifted sufficiently to start the brief progressive retirement of the chasers;

Fig. 7 is a fragmentary sectional view taken on the line 7—7 of Fig. 2;

Fig. 8 is a similar view taken on the line 8—8 of Fig. 2;

Fig. 9 is a transverse sectional view taken on the line 9—9 of Fig. 3;

Fig. 10 is a perspective view of the latch-member of the structure of Figs. 1 to 9 inclusive;

Fig. 11 is a view in side elevation of an automatic collapsing tap embodying the present invention;

Fig. 12 is a view thereof in central longitudinal section;

Fig. 13 is a schematic sectional view showing the action of one of the chasers of the self-opening die-head in cutting tapered threads upon the work and the resultant longitudinal shoulder upon the latter;

Fig. 14 is a broken face view of a section of the work shown in Fig. 13;

Fig. 15 is a transverse sectional view through the work, showing the erasure of the longitudinal shoulder appearing in Fig. 13, by the novel action of the self-opening die-head structure of Figs. 1 to 10 inclusive;

Fig. 16 is a fragmentary perspective view of the chaser-operating sleeve; and

Fig. 17 is an enlarged fragmentary view of the let-off shoulder and cooperating parts of the structure shown in Fig. 12.

The automatic-releasing or self-opening die-head herein chosen for the illustration of the present invention in Figs. 1 to 10 inclusive comprises a body-member, generally designated by the reference character 20, having at its forward end an enlarged head-portion 21 and provided at its rear end with a hollow shank 22. The said head-portion 21 is formed in its forward face with four (more or less) equidistant radial slots 23, in each of which is mounted a radially-movable chaser 24.

The inner edge of each of the chasers 24, just referred to, is formed with a series of thread-cutting teeth 25 tapering forwardly and outwardly at an angle substantially corresponding to the desired angle of the threads to be cut upon the work. For purposes of clarity of illustration, the taper of each series of thread-cutting teeth 25, just referred to, has been exaggerated over and above the taper customary in pipe-threads.

The chasers 24 are retained in place in the slots 23 in the head-portion 21 of the body-member 20 by means of segmental plates 26 which are secured to the said head-portion by screws 27. Each chaser is formed at its outer end with a sloping cam-surface 28 which is engaged by a similarly-sloping cam-surface 29, one of which latter is formed upon the inner forward corner of a substantially-cup-shaped chaser-operating sleeve 30 adjacent each of the said chasers. The said chaser-operating sleeve is mounted upon the body-member 20 with capacity for axial sliding movement thereon, and bears at its forward end upon the periphery of the head-portion 21 of the body-member, and at its rear end bears upon the periphery of a latch-carrying ring 31 mounted upon the said body-member with capacity for axial adjustment thereon. The axial adjustment of the latch-carrying ring 31, just referred to, is effected by an adjusting-nut 32 threaded upon the body-member 20 just forwardly of the shank 22 thereof.

The latch-carrying ring 31, above referred to, is formed with a transverse notch 33 provided for the reception and guidance of a substantially-semicircular latch-member 34, the outer periphery of which corresponds in curvature to the curvature of the outer periphery of the latch-carrying ring 31, above referred to. The forward face of the latch-member 34 constitutes a latching-abutment generally designated by the reference character 35 and is adapted to engage with a substantially-semicircular latching-abutment 36 curved lengthwise of itself and formed in the interior of the chaser-operating sleeve 30 for the purpose of releasably holding the said sleeve in its forward chaser-closing position against the rearward urge of a pair of retracting-springs 37—37 (Figs. 8 and 9). The said retracting-springs are respectively located at diametrically-opposite points in the die-head structure, as shown in Fig. 9, and have their forward ends seated in sockets 38 opening rearwardly through the head-portion 21 of the body-member 20. The rear end of each of the said retracting-springs is seated in a socket 39 opening forwardly from the adjacent contracted portion of the chaser-operating sleeve 30.

To provide for the erasure of longitudinal shoulders which might otherwise be left upon the work by the chasers, the outer forward corner of the latch-member 34 is cut away to provide an outwardly-and-rearwardly-inclined let-off shoulder 35a which extends from a radially-extending latching-shoulder 35b of the said latch-member 34 to the outer periphery thereof. The said let-off shoulder is most clearly shown in Figs. 5, 6 and 10 of the accompanying drawings and, together with the latching-shoulder 35b, constitutes part of the latching-abutment 35. In the particular type of structure shown in the said figures, the let-off shoulder 35a preferably has an inclination of about 8½° with respect to the plane of the latching-shoulder 35b of the latch-member 34, but in any event, the said let-off shoulder must have a non-camming angle-relationship of substantially less than 45° with respect to the plane of the latching-shoulder which it intersects, so that the said let-off shoulder cannot act as a cam-surface and thus enable the chaser-operating sleeve 30 (acting under the urge of the springs 37—37) to force the latch-member 34 inwardly into its retired position. If the latter action were to be permitted, the let-off shoulder 35a would cease to function as such, and the chasers would be retired substantially instantaneously, thus leaving marks or ridges upon the work.

To provide for disengaging the latch-member 34 from the latching-shoulder 36 in the chaser-operating sleeve 30, by means of an external abutment to permit the rearward retirement of the said sleeve under the urge of its springs 37—37, a tripping-sleeve 41 is employed which is mounted upon the chaser-operating sleeve 30 with capacity for axial movement thereon. The said tripping-sleeve 41 is provided with an internal cam-surface 42 which, when the sleeve is moved rearwardly, is adapted to exert inward pressure upon a ball 43 which is movable radially in a radial guide-passage 44 formed in the rear portion of the chaser-operating sleeve 30. The said ball 43 is adapted to bear upon the periphery of the latch-member 34 for the purpose of urging the latter inwardly, as will hereinafter appear.

Save for the let-off shoulder 35a in particular, the die-head organization above described may be said to be old in the art and it has been set forth and described herein for the purpose of enabling the operation of the let-off shoulder or its equivalent to be properly understood.

For purposes of description, let it be presumed that the die-head structure is mounted by means of its shank 22 in the rotating chuck of a thread-cutting machine and that it is advanced axially toward the work 45 for the purpose of cutting a pipe-thread thereon.

After the die-head has been threaded onto the work as above described to the desired extent, the tripping-sleeve 41 will have been arrested, by any suitable stop, against further forward movement with the die-head structure so as to cause its cam-surface 42 to act through the ball 43 to move the latch-member 34 inwardly into the position in which it is shown in Fig. 6, thus bringing the sloping let-off shoulder 35a of the said latch-member into position for coaction with the lower edge of the latching-abutment 36 in the chaser-operating sleeve 30. The chasers 24 will now be in progress of cutting the threads upon the work 45 and each will be producing a longitudinal shoulder 46 (Figs. 13 and 14) upon the threaded portion of the work 45. If at this time the chasers were to be instantly released from the work, as is the ordinary practice, the shoulders 46 or their equivalent would remain visible upon the threaded portion of the work 45. Instead, however, of abruptly retiring the chasers out of engagement with the work, the let-off shoulder 35a upon the latch-member 34 will now come into action and, though operating within a very short period of time, will now cause the said chasers to retire slowly for a short distance to thus "erase," so to speak, the longitudinal shoulders 46 from the threaded portion of the work, as may be seen by comparing Fig. 13 with Fig. 15 of the accompanying drawings. As soon as the outer edge of the let-off shoulder 35a clears the inner edge of the latching-abutment 36, the chaser-operating sleeve 30 will be snapped rearwardly by its retracting-springs 37 into the position in which it is shown in Fig. 4, thereby permitting the individual retracting-springs 47 of the chasers 24 to force the said chasers radially outwardly completely clear of the work so that the die-head structure and the work may be axially separated preparatory to another threading operation.

In Figs. 11 and 12 is shown a so-called "collapsing tap" structure incorporating the novel let-off feature of the present invention. The collapsing tap referred to includes a cylindrical body-member 50 having an axial bore 51 for the reception of a chaser-operating plunger 52 which reciprocates therein. The forward end of the said chaser-operating plunger is tapered and formed with chaser-actuating ribs 53 fitting into corresponding grooves in the inner ends of a set of thread-cutting chasers 54, each of which is formed in its outer edge with a sloping series of thread-cutting teeth 55. The chasers 54 are mounted in radial grooves 56 formed in the forward end of the body member 50 and are normally held in place against forward displacement by a cap 57 secured to the forward end of the said body-member 50.

Mounted upon the forward portion of the body-member 50, with capacity for axial sliding movement thereon, is a latch-carrying sleeve 58 which in turn has mounted upon it, also with capacity for axial movement, a tripping-sleeve 59. The rear portion of the tripping-sleeve 59 bears upon the periphery of an annular flange 60 which forwardly projects from an adjusting-ring 61, which latter is provided with internal threads 62 for engagement with external threads 63 formed upon the periphery of the body-member 50.

Adjacent its rear end, the chaser-operating plunger 52 is formed with an elongated diametrical passage 64 through which extends a coupling-bar 65 which extends through a clearance-slot 66 formed in the adjacent portion of the body-member 50 and into coupled relationship with the latch-carrying sleeve 58, before described. The said coupling-bar 65 thus serves to couple the latch-carrying sleeve 58 with the chaser-operating plunger 52 for concurrent axial movement with respect to the collapsing-tap structure.

Projecting rearwardly from the chaser-operating plunger 52 is a bolt 67 having at its rear end a kerfed head 68, the under face of which latter forms a forwardly-facing spring-seat for engagement by the forward end of a helical retracting-spring 69 which encircles the rear portion of the bolt 67 and bears at its forward end against a washer-like spring-seat 70 through which the said bolt 67 extends, as is clearly shown in Fig. 12.

The latch-carrying sleeve 58 is formed with a notch 71 which receives and guides a radially-movable semicircular ring-shaped latch-member 72, the rear face of which constitutes a latching-abutment similar to the latching-abutment 35 of the self-opening die-head before described, and which is adapted to engage with a latching-abutment 74 constituting the forward face of the flange 60 of the adjusting-ring 61, before described. Like the latching-abutment 35 of the latching-member 34, before described, the latching-abutment formed by the rear face of the latching-member 72 now under discussion, is formed with a radially-extending latching-shoulder 75a and a sloping let-off shoulder 75b which joins the latching-shoulder 75a with the outer surface of the latch-member 72. To effect the inward movement of the latch-member 72 to permit the inward retirement of the chasers 54, the said latch-member is formed in its forward outer corner with a cam-surface 76 which is engaged by a similarly-sloped cam-surface 77 formed in the interior of the tripping-sleeve 59.

For the purpose of manually moving the tripping-sleeve 59 rearwardly to effect the manual tripping of the tap or for moving the said tripping-sleeve forwardly, to cause the same in turn to similarly move the latch-carrying sleeve 58, to reset the chasers 54 in their projected or operative positions, a lever-handle 78 is employed. The said lever-handle is mounted in the tripping-sleeve 59 upon a transverse pin 79, which latter extends diametrically through a spherically-contoured boss 80 on the said handle. The said spherically-contoured boss 80 fits within a passage 81 in the said sleeve 59 and serves to exclude chips and dirt from the interior of the die-head structure. The inner end of the lever-handle 78 projects inwardly through a clearance-passage 82 formed in the latch-carrying sleeve 58 and is provided with a spherically-contoured terminal 83 fitting into a socket 84 formed in the body-member 50, before referred to.

In brief, the operation of the collapsing tap illustrated in Figs. 11 and 12 is as follows:

Assuming that the parts are in the positions in which they are shown in the drawings, the tap will be moved toward the work or the work toward the tap so as to cause the now-projected chasers 54 to enter the work. When the work has been threaded to the desired extent, the tap may be tripped for retiring the chasers 54 inwardly completely out of engagement with the work either by an abutment acting to move the tripping-sleeve 59 rearwardly with respect to the die-head structure or by the manual rearward movement of the upper end of the lever-handle 78. When the tripping-sleeve 59 is moved rearwardly as described, its cam-surface 76 will act upon the cam-surface 77 of the latch-member 72 and force the latter inwardly. Shortly after the starting of the inward movement of the latch-member 72 its radially-extending latching-shoulder 75a will ride clear of the inner corner of the latching-abutment 74 and the sloping let-off shoulder 75b will now ride against the inner corner or edge of the said abutment 74 and for a brief interval of time, thus gradually retire the chasers 54 under the urge of the spring 69 acting through the chaser-operating member 52. As soon as the outer end of the let-off shoulder 75b has cleared the inner edge of the latching-abutment 74, the latch-carrying sleeve and hence the chaser-operating plunger 52 will be moved quickly to the rear to thus effect the complete retirement of the chasers 54 so that the die-head structure and the now-threaded work may be axially separated preparatory to another threading operation.

The let-off shoulder 75b of the structure of Figs. 11 and 12 functions in substantially the same manner as the let-off shoulder 35a of the structure of Figs. 1 to 10 inclusive and will serve to cause the erasure or substantial erasure of longitudinal lines or shoulders which might otherwise be left in the threaded portion of the work, were the chasers 54 to be fully retired without the intervention of the said let-off shoulder 75b.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. An automatic-releasing thread-cutting tool, comprising: a body-unit having a latching-abutment; a plurality of substantially-radially retirable and advanceable thread-cutting chasers carried by the said body-unit; spring-means urging the said chasers into their retired or inoperative positions; a latch-releasing member; and a latch-member movable into releasing position by the said latch-releasing member and releasably holding the said chasers in their advanced or thread-cutting positions, the said latch-member being provided with a latching-abutment positioned to engage with the latching-abutment of the said body-unit; one of the aforesaid latching-abutments comprising a latching-shoulder and a let-off shoulder intersecting the said latching-shoulder and inclined with respect to the plane thereof at a non-camming angle of substantially less than 45°, the said latching-shoulder being positioned to fixedly restrain the said chasers in their advanced or thread-cutting positions during the normal thread-cutting operation of the tool and the said let-off shoulder being positioned and inclined to cause the progressive retirement of the said chasers at the termination of the normal thread-cutting operation to substantially erase longitudinal shoulders left upon the work by the said chasers.

2. An automatic-releasing thread-cutting tool, comprising: a body-unit having latching-abutment curved lengthwise of itself; a plurality of substantially-radially retirable and advanceable thread-cutting chasers carried by the said body-unit; spring-means urging the said chasers into their retired or inoperative positions; a latch-releasing member; and a latch-member curved lengthwise of itself and movable into releasing position by the said latch-releasing member and releasably holding the said chasers in their advanced or thread-cutting positions, the said latch-member being provided with a latching-abutment curved lengthwise of itself and positioned to engage with the latching-abutment of the said body-unit; one of the aforesaid latching-abutments comprising a latching-shoulder curved lengthwise of itself and a let-off shoulder curved lengthwise of itself and intersecting the said latching-shoulder and inclined with respect to the plane thereof at a non-camming angle of substantially less than 45°, the said latching-shoulder being positioned to fixedly restrain the said chasers in their advanced or thread-cutting positions during the normal thread-cutting operation of the tool and the said let-off shoulder being positioned and inclined to cause the progressive retirement of the said chasers at the termination of the normal thread-cutting operation to substantially erase longitudinal shoulders left upon the work by the said chasers.

3. An automatic-releasing thread-cutting tool, comprising: a body-unit having a latching-abutment; a plurality of substantially-radially retirable and advanceable thread-cutting chasers carried by the said body-unit; spring-means urging the said chasers into their retired or inoperative positions; a latch-releasing member; and a latch-member releasable by the said latch-releasing member and releasably holding the said chasers in their advanced or thread-cutting positions, the said latch-member being provided with a latching-abutment comprising a latching-shoulder arranged to engage with the latching-abutment of the said body-unit to fixedly but releasably hold the said chasers in their advanced or thread-cutting positions, and a let-off shoulder intersecting the said latching-shoulder at a non-camming angle of substantially less than 45° with respect to the plane thereof and operatively engaging the latching-abutment of the said body-unit after the said latching-shoulder has been moved out of operative engagement with the same to subsequently cause the progressive retirement of the said chasers to substantially erase longitudinal shoulders left upon the work by the said chasers.

4. An automatic-releasing thread-cutting tool, comprising: a body-unit having a latching-abutment curved lengthwise of itself; a plurality of substantially-radially retirable and advanceable thread-cutting chasers carried by the said body-unit; spring-means urging the said chasers into their retired or inoperative positions; a latch-releasing member; and a latch-member curved lengthwise of itself and releasable by the said latch-releasing member and releasably holding the said chasers in their advanced or thread-cutting positions, the said latch-member being provided with a latching-abutment curved lengthwise of itself and comprising a latching-shoulder curved lengthwise of itself and arranged to engage with the latching-abutment of the said body-unit to fixedly but releasably hold the said chasers in their advanced or thread-cutting positions, and a let-off shoulder curved lengthwise of itself and intersecting the said latching-shoulder at a non-camming angle of substantially less than 45° with respect to the plane thereof and operatively engaging the latching-abutment of the said body-unit after the said latching-shoulder has been moved out of operative engagement with the same to subsequently cause the progressive retirement of the said chasers to substantially erase longitudinal shoulders left upon the work by the said chasers.

5. A self-opening die-head, comprising: a body-unit having a latching-abutment; a plurality of substantially-radially retirable and advanceable thread-cutting chasers carried by the said body-unit; spring-means urging the said chasers outwardly into their inoperative positions; a latch-releasing member; and a latch-member movable into its releasing position by the said latch-releasing member and releasably holding the said chasers in their inwardly-projected thread-cutting positions, the said latch-member being provided with a latching-abutment positioned to engage with the latching-abutment of the said body-unit; one of the aforesaid latching-abutments comprising a latching-shoulder and a let-off shoulder intersecting the said latching-shoulder and inclined with respect to the plane thereof at a non-camming angle of substantially less than 45°, the said latching-shoulder being positioned to fixedly restrain the said chasers in their inwardly-projected thread-cutting positions during the normal thread-cutting operation of the die-head and the said let-off shoulder being positioned and inclined to cause the progressive retirement of the said chasers at the termination of the normal thread-cutting operation to substantially erase longitudinal shoulders left upon the work by the said chasers.

6. A self-opening die-head, comprising: a body-unit having a latching-abutment curved lengthwise of itself; a plurality of substantially-radially retirable and advanceable thread-cutting chasers carried by the said body-unit; spring-means urging the said chasers outwardly into their inoperative positions; a latch-releasing member; and a latch-member curved lengthwise of itself and movable into its releasing position by the said latch-releasing member and releasably holding the said chasers in their inwardly-projected thread-cutting positions, the said latch-member being provided with a latching-abutment curved lengthwise of itself and positioned to engage with the latching-abutment of the said body-unit; one of the aforesaid latching-abutments comprising a latching-shoulder curved lengthwise of itself and a let-off shoulder curved lengthwise of itself and intersecting the said latching-shoulder and inclined with respect to the plane thereof at a non-camming angle of substantially less than 45°, the said latching-shoulder being positioned to fixedly restrain the said chasers in their inwardly-projected thread-cutting positions during the normal thread-cutting operation of the die-head and the said let-off shoulder being positioned and inclined to cause the progressive retirement of the said chasers at the termination of the normal thread-cutting operation to substantially erase longitudinal shoulders left upon the work by the said chasers.

7. A collapsing tap, comprising: a body-unit having a latching-abutment; a plurality of substantially-radially retirable and advanceable thread-cutting chasers carried by the said body-unit; spring-means urging the said chasers radially inwardly into their retired positions; a latch-releasing member; and a latch-member releasable by the said latch-releasing member and releasably holding the said chasers in their outwardly-projected thread-cutting positions, the said latch-member being provided with a latching-abutment comprising a latching-shoulder arranged to engage with the latching-abutment of the said body-unit to fixedly but releasably hold the said chasers in their advanced or thread-cutting positions, and a let-off shoulder intersecting the said latching-shoulder at a non-camming angle of substantially less than 45° with respect to the plane thereof and operatively engaging the latching-abutment of the said body-unit after the said latching-shoulder has been moved out of operative engagement with the same to subsequently cause the progressive retirement of the said chasers to substantially erase longitudinal shoulders left upon the work by the said chasers.

8. A collapsing tap, comprising: a body-unit having a latching-abutment curved lengthwise of itself; a plurality of substantially-radially retirable and advanceable thread-cutting chasers carried by the said body-unit; spring-means urging the said chasers radially inwardly into their retired positions; a latch-releasing member; and a latch-member curved lengthwise of itself and releasable by the said latch-releasing member and releasably holding the said chasers in their outwardly-projected thread-cutting positions, the said latch-member being provided with a latching-abutment curved lengthwise of itself and comprising a latching-shoulder curved lengthwise of itself and arranged to engage with the latching-abutment of the said body-unit to fixedly but releasably hold the said chasers in their advanced or thread-cutting positions, and a let-off shoulder curved lengthwise of itself and intersecting the said latching-shoulder at a non-camming angle of substantially less than 45° with respect to the plane thereof and operatively engaging the latching-abutment of the said body-unit after the said latching-shoulder has been moved out of operative engagement with the same to subsequent cause the progressive retirement of the said chasers to substantially erase longitudinal shoulders left upon the work by the said chasers.

ALBERT F. BREITENSTEIN.